United States Patent
Hirota et al.

(10) Patent No.: US 6,292,268 B1
(45) Date of Patent: Sep. 18, 2001

(54) IMAGE PROCESSOR AND IMAGE PROCESSING METHOD HANDLING MULTILEVEL IMAGE DATA

(75) Inventors: Soh Hirota, Toyokawa; Kaoru Tada, Aichi-Ken; Kazuhiro Ishiguro, Toyokawa, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/144,466

(22) Filed: Sep. 1, 1998

(30) Foreign Application Priority Data

Sep. 4, 1997 (JP) .................................................... 9-239464

(51) Int. Cl.[7] ........................................................ B41B 0/00
(52) U.S. Cl. .......................... 358/1.9; 358/456; 382/237; 382/252
(58) Field of Search .................................... 382/251, 252, 382/237, 270; 358/455, 456, 1.9

(56) References Cited

U.S. PATENT DOCUMENTS

| 5,243,445 | 9/1993 | Koike . |
| 5,898,796 | * 4/1999 | Kumashiro ........................... 382/252 |

FOREIGN PATENT DOCUMENTS

| 4-002271 | 1/1992 | (JP) . |
| 4-057476 | 2/1992 | (JP) . |
| 4-094266 | 3/1992 | (JP) . |
| 4-124974 | 4/1992 | (JP) . |

* cited by examiner

Primary Examiner—Thomas D. Lee
(74) Attorney, Agent, or Firm—Burns, Doane, Swecker & Mathis, LLP

(57) ABSTRACT

An image processor converts pixel data represented with m gradations into pixel data represented with n gradations by using the error diffusion method. The m and n are both given integers and satisfy $2<n<m$. Not only the error but also a weight assigning value is added to pixel data to be converted. The weight assigning value is determined according to the values of m and n.

13 Claims, 10 Drawing Sheets

FIG. 8

| W(0,0) | W(0,1) | W(0,2) | W(0,3) |
|--------|--------|--------|--------|
| W(1,0) | W(1,1) | W(1,2) | W(1,3) |
| W(2,0) | W(2,1) | W(2,2) | W(2,3) |
| W(3,0) | W(3,1) | W(3,2) | W(3,3) |

Row →

Line ↓

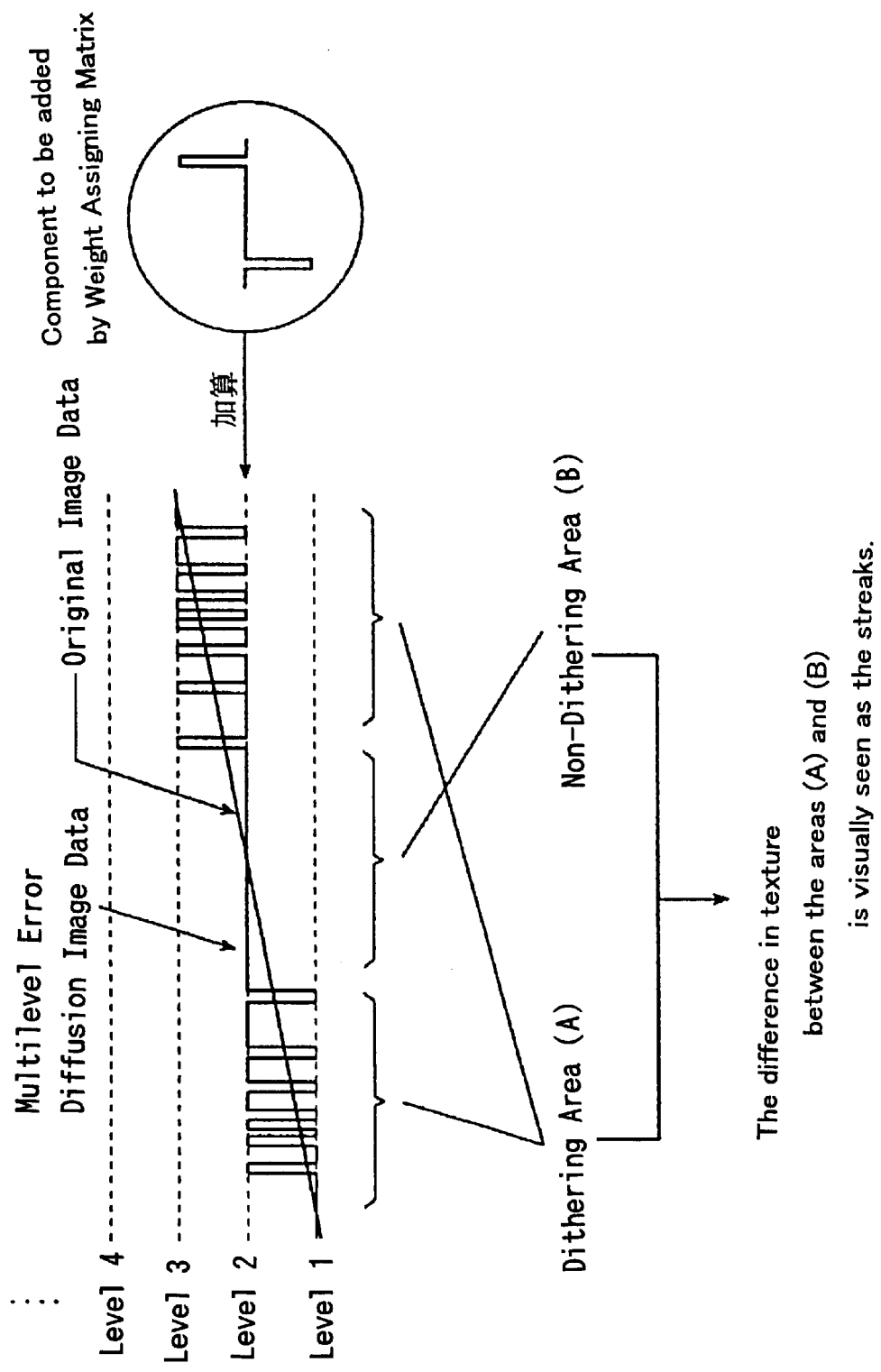

F I G. 1 0
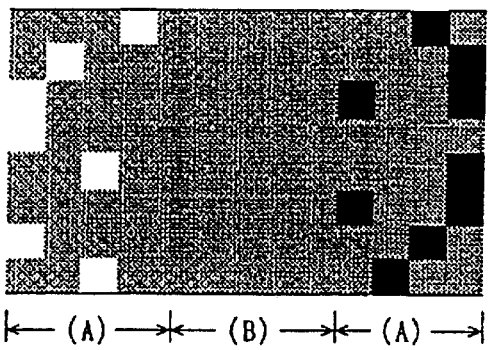
|←— (A) —→|←— (B) —→|←— (A) —→|
F I G. 1 1
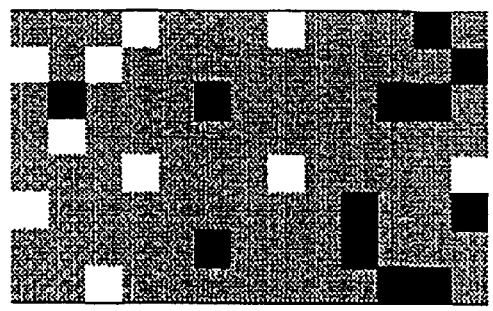
F I G. 1 2
| -1 | +1 | -1 | +1 |
|---|---|---|---|
| -1 | +1 | -1 | +1 |
| -1 | +1 | -1 | +1 |
| -1 | +1 | -1 | +1 |
F I G. 1 3
| -1 | 0 | 0 | 0 | +1 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| +1 | 0 | 0 | 0 | -1 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

F I G. 1 4

| W(0,0) | W(0,1) | W(0,2) | W(0,3) | W(0,4) | W(0,5) | W(0,6) | W(0,7) |
|--------|--------|--------|--------|--------|--------|--------|--------|
| W(1,0) | W(1,1) | W(1,2) | W(1,3) | W(1,4) | W(1,5) | W(1,6) | W(1,7) |
| W(2,0) | W(2,1) | W(2,2) | W(2,3) | W(2,4) | W(2,5) | W(2,6) | W(2,7) |
| W(3,0) | W(3,1) | W(3,2) | W(3,3) | W(3,4) | W(3,5) | W(3,6) | W(3,7) |
| W(4,0) | W(4,1) | W(4,2) | W(4,3) | W(4,4) | W(4,5) | W(4,6) | W(4,7) |
| W(5,0) | W(5,1) | W(5,2) | W(5,3) | W(5,4) | W(5,5) | W(5,6) | W(5,7) |
| W(6,0) | W(6,1) | W(6,2) | W(6,3) | W(6,4) | W(6,5) | W(6,6) | W(6,7) |
| W(7,0) | W(7,1) | W(7,2) | W(7,3) | W(7,4) | W(7,5) | W(7,6) | W(7,7) |

IMAGE PROCESSOR AND IMAGE PROCESSING METHOD HANDLING MULTILEVEL IMAGE DATA

This application is based on application No. 9-239464 filed in Japan, the contents of which is hereby incorporated by reference.

BACKGROUND OF THE INVENTION

1. Field of the Invention

The present invention relates to an image processor and an image processing method, and more particularly, to an image processor and an image processing method for processing multilevel image data by an error diffusion method.

2. Description of the Related Art

Conventionally, for example, a technology of processing multilevel image data by use of the error diffusion method has been proposed as shown in Japanese Laid-open Patent Application No. H4-2271.

For example, image data representing the image density of each pixel with 8 bits, i.e. image data of 256 gradations are input as input data, and by comparing the image data with a plurality of threshold values, the number of gradations is reduced to that of image data representing the image density of each pixel with 4 bits, i.e. that of image data of 16 gradations. In this processing, the error diffusion method is used.

The error diffusion method is intended for, when the image is viewed as a whole, reducing the difference between the input image data and the output image data having undergone a conversion, i.e. an error caused by the conversion. Specifically, when a conversion is performed for a target pixel, an error or the difference between the pre-conversion value of the target pixel and the post-conversion value thereof is dispersed to pixels situated on the periphery of the target pixel to thereby restrain the error in the image as a whole.

However, the error diffusion method has the following problem:

According to the image data to be converted, streaks sometimes appear in the post-conversion image data. Specifically, the gradation level 16 of the input image data of 256 gradations completely corresponds to the gradation level 1 of the post-conversion image data of 16 gradations, so that no error is caused. On the contrary, for example, for the gradation level 8 of the 256-gradation image data, since it is situated between the gradation level 0 and the gradation level 1 of the 16-gradation image data, an error is caused irrespective of which level it is converted to. The error is dispersed to peripheral pixels. Consequently, image data having the gradation level 8 of the 256-gradation image data are alternately converted to the gradation level 0 and to the gradation level 1 of the 16-gradation image data, so that the image data are represented with the gradation level 0 and the gradation level 1 by dithering. Thus, in an image which changes with a gentle density gradient between gradation levels accurately represented without any errors and gradation levels represented by dithering, when the number of gradations is reduced by error diffusion, the boundaries appear as streaks.

OBJECTS AND SUMMARY

The present invention is made in view of the above-described circumstances, and an object thereof is to provide an improved image processor and image processing method.

Another object of the present invention is to restrain image quality degradation when the number of gradations of input multilevel image data is reduced in an image processor and an image processing method using the error diffusion method.

Still another object of the present invention is to prevent streaks from appearing on the image when the number of gradations of input multilevel image data is reduced in the image processor and the image processing method using the error diffusion method.

To achieve the above-mentioned and other objects, an image processor, which converts image data represented with m gradations into image data represented with n gradations by use of the error diffusion method, comprises: a comparator for comparing image data of a target pixel with a predetermined threshold value to perform gradation conversion; a subtracter for calculating an error between the image data having been converted by the comparator and image data before the conversion; an error memory for diffusing the error calculated by the subtracter to pixels situated on the periphery of the target pixel; a selecting unit for selecting an image data processing mode; and weight assigning means for adding a weight assigning value corresponding to the processing mode selected by the selecting unit to the pixel data of the pixel to be converted.

The above-mentioned m and n are both given integers and satisfy 2<n<m.

In the present invention, in the above-described image processor, the weight assigning value added by the weight assigning means is decided in accordance with the value of the above-mentioned n.

BRIEF DESCRIPTION OF THE DRAWINGS.

These and other objects and features of the present invention will become apparent from the following description of a preferred embodiment thereof taken in conjunction with the accompanying drawings, in which:

FIG. 8 is a view showing the arrangement of a weight assigning matrix;

FIG. 9 is a view of assistance in explaining effects of the digital copier of FIG. 5;

FIG. 10 is a view of assistance in explaining problems of multilevel error diffusion;

FIG. 11 is a view of assistance in explaining effects of the present invention;

FIG. 12 is a view showing a first modification of a weight assigning matrix A;

FIG. 13 is a view showing a second modification of the weight assigning matrix A; and FIG. 14 is a view showing the arrangement of the matrix of FIG. 13.

In the following description, like parts are designated by like reference numbers throughout the several drawing.

DETAILED DESCRIPTION OF THE PREFERRED EMBODIMENTS.

Figure 1:
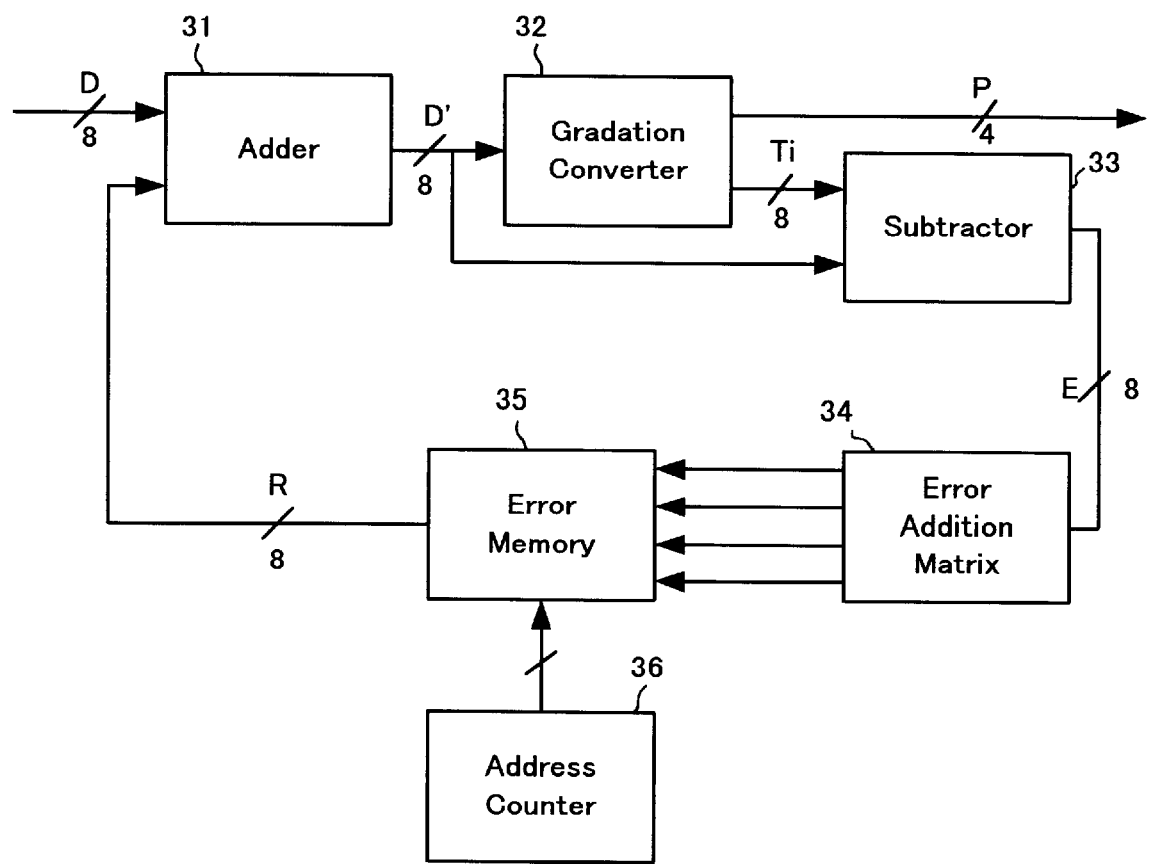
FIG. 1 is a block diagram showing a multilevel error diffusion processing circuit.

FIG. 1 is a block diagram showing the configuration of an image processor using a multilevel error diffusion method.

This image processor performs image processing based on the so-called error diffusion method. In the processor shown in FIG. 1, data representing each pixel with 8 bits, i.e. image data of 256 gradations are input as input data D. As output data P, data representing each pixel with 4 bits, i.e. image data of 16 gradations are output.

The image processor comprises: an adder 31 for adding the input image data D and a correction value R; a gradation converter 32 for comparing the value of the output D' of the adder 31 with a plurality of threshold values to output the output data P; a subtracter 33 for subtracting the value of the output Ti of the gradation converter 32 from the value of the output D' of the adder 31; an error addition matrix 34 for dispersing the output E of the subtracter 33 to pixels situated on the periphery of a pixel to be processed (target pixel); and an error memory 35 for storing the output of the error addition matrix 34 therein.

Figure 2:
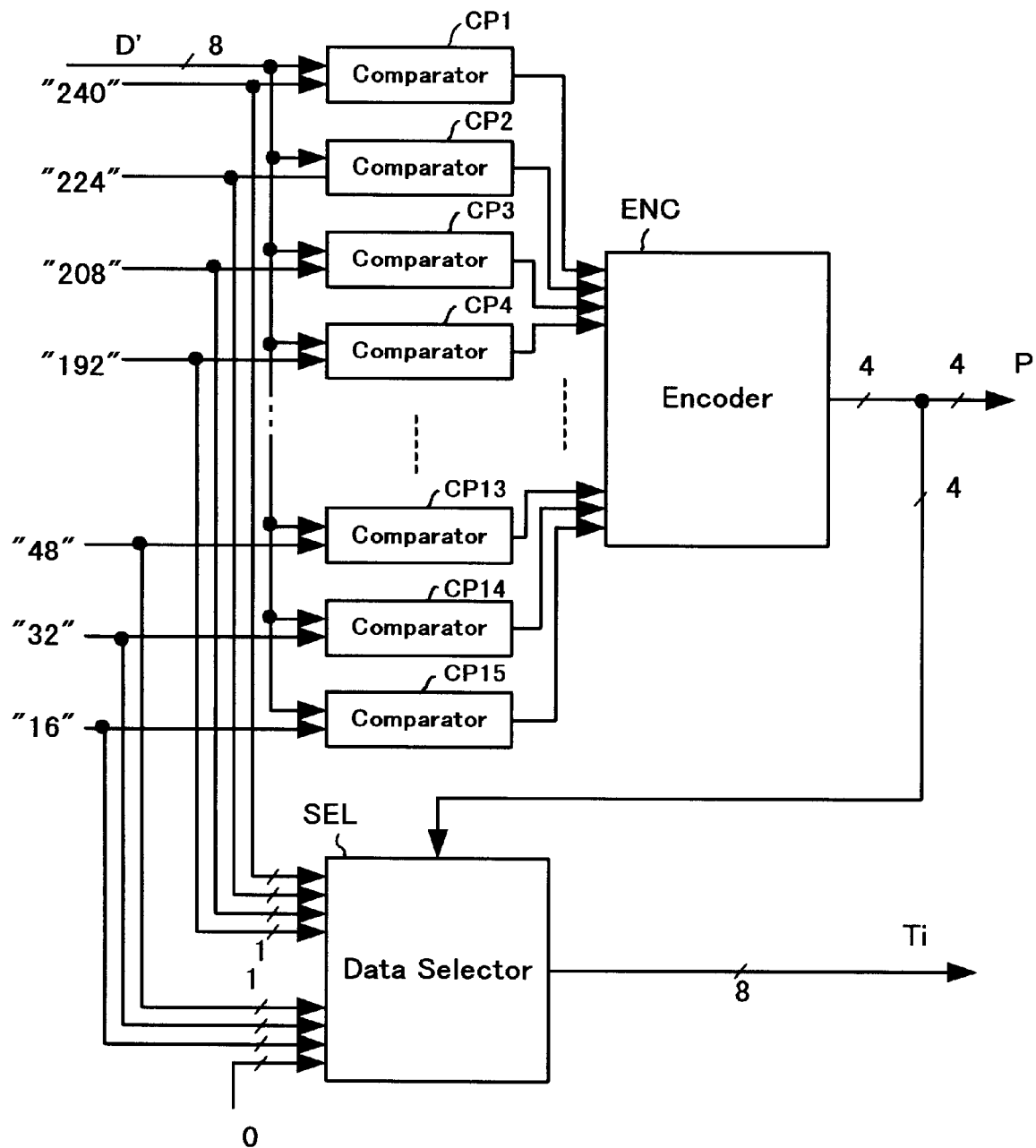
FIG. 2 is a block diagram showing the configuration of a gradation converter 32 of FIG. 1.

FIG. 2 is a block diagram showing the configuration of the gradation converter 32 of FIG. 1.

Referring to the figure, the gradation converter 32 comprises: comparators CP1 to CP15 for comparing the output D' of the adder 31 with different threshold values and outputting "1" when the output D' of the adder 31 is higher than the threshold values; an encoder ENC for adding the outputs of the comparators CP1 to CP15; and a data selector SEL for selecting and outputting a desired one of the threshold values based on the output of the encoder ENC. The output of the encoder ENC is the post-gradation-conversion output data P of 4 bits, whereas the output of the data selector SEL is the data Ti input to the subtracter 33. The lowest one of the threshold values is "16" and the highest one is "240". Since the threshold values are set in increments of 16 from 16 to 240, fifteen threshold values are provided.

Now referring to FIGS. 1 and 2, a specific operation of the image processor will be described.

The image data D input to the adder 31 is the data representing each pixel with 8 bits. The image data D and the correction value R are added into the post-correction data D', which is input to the gradation converter 32. At the gradation converter 32, the comparators CP1 to CP15 compare the post-correction image data D' with the predetermined 15 threshold values (16, 32, 48, ... , 192, 208, 224, 240). The comparison results of the comparators CP1 to CP15 are converted to the 4-bit data P by the encoder ENC. The 4-bit data P is the post-multilevel-error-diffusion-processing image data.

That is, the gradation converter 32 converts input 8-bit image data into 4-bit image data. Moreover, at the gradation converter 32, the data selector SEL controlled by the output P of the encoder ENC selects one value from among the 15 threshold values and "0", and outputs the selected value as the data Ti. For example, when the value of the post-correction data D' (a numeric value not less than 16 but less than 32) is 20, a numeric value 16 is output as the data Ti, and when the value of the post-correction image data D' (a numeric value not less than 32 but less than 48) is 40, a numeric value 32 is output.

The subtracter 33 detects the error E caused by the conversion by the gradation converter 32 based on the difference between the input D' and the output Ti of the gradation converter 32. Specifically, the difference between the post-correction data D' and the output data Ti is output as the error E.

The error addition matrix 34 calculates the error diffusion value based on the output error E. Specific weight coefficients for the diffusion value calculated by the error addition matrix 34 are shown in FIG. 3.

Figures 3, 4:
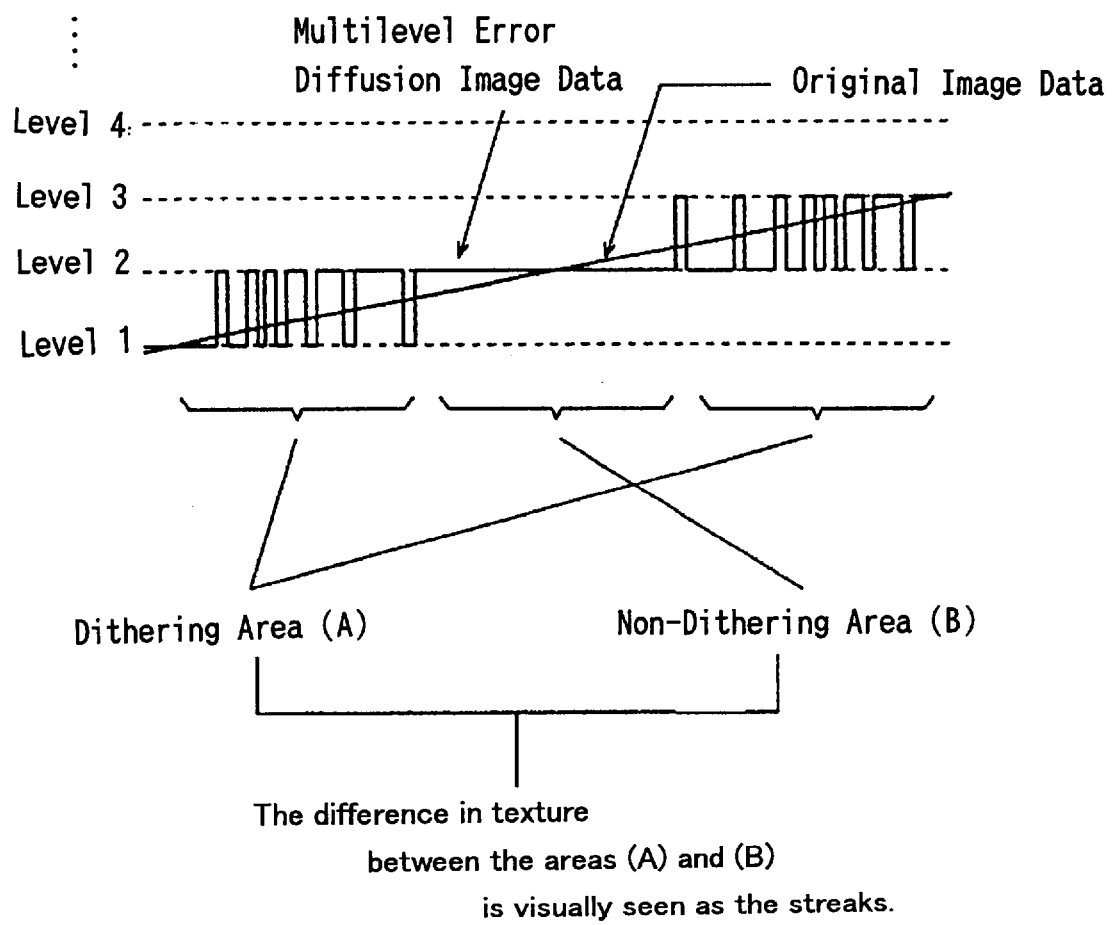
FIG. 3 is a view of assistance in explaining the configuration of an error addition matrix 34 of FIG. 1.
FIG. 4 is a view of assistance in explaining a problem of the multilevel error diffusion processing circuit of FIG. 1.

In FIG. 3, the asterisk represents the pixel to be processed (target pixel), and the numeric values at other pixels represent the weight coefficients of peripheral pixels. In the example shown in FIG. 3, the values calculated as the diffusion values are (2/6)E for the peripheral pixels situated at the right of and below the target pixel and (1/6)E for the peripheral pixels situated at the lower left and at the lower right of the target pixel. These diffusion values are stored by being added to corresponding pixel positions (addresses) on the error memory 35. That is, the previously stored values are read out and the new diffusion values are added thereto, and the results of the addition are stored at the same pixel positions.

The data stored in the error memory 35 is read out from the address specified by an address counter 36 for determining the pixel position in synchronism with scanning of the pixel of the input image data D. The read data is input to the adder 31 as the correction value R.

In the image processor thus configured, the output data after the error diffusion processing represents each pixel with a plurality of bits (4 bits in the above-described example). Consequently, the gradation change of the output data is moderate compared to when the output data is output in 1 bit, that is, when recording/non-recording data are output.

In the image processor configured as described above, although the gradation change of the output data is moderate as mentioned above, peculiar streaks appear in the output image when there is a gentle density gradient in the input image.

FIG. 4 is a view of assistance in explaining the cause of this problem.

In the figure, when the input image data (original image data) has a gentle density gradient ranging from the gradation level 1 to the gradation level 3 of the output image, both an area (A) gradation-represented by dithering and an area (B) not gradation-represented by dithering are present in the output image (multilevel error diffusion image data). As a result, the difference in texture between the areas (A) and (B) is visually seen as the streaks pseudo contours).

To prevent such streaks from appearing, a method is considered which superimposes a periodic pattern on the image. However, performing such a processing degrades the resolution when the original image data represents a character image, which degrades the quality of the character.

Hereinafter, a digital copier or an image data processor having solved this problem will be described.

Figure 5:
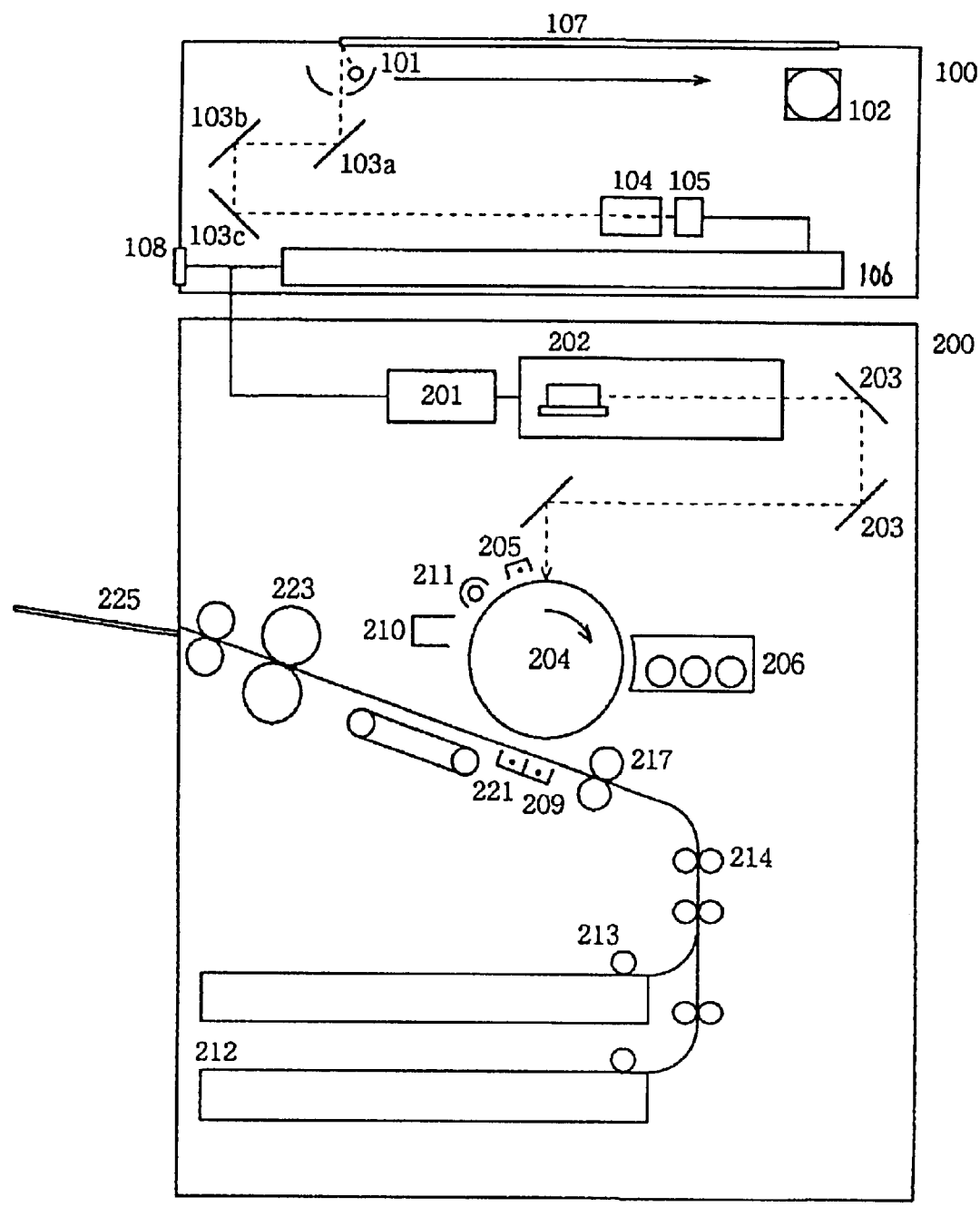
FIG. 5 is a view showing the structure of a digital copier.

FIG. 5 is a view showing the structure of the digital copier. The digital copier comprises an image reading section 100 and a printer section 200. Normally, image data read at the image reading section 100 are transmitted to the printer section 200 and the printer section 200 forms images to thereby achieve a copying function.

Since the digital copier can be connected to an external apparatus through an interface 108, the data read at the image reading section 100 can be output to the external apparatus and image data can be transmitted from an external apparatus to the printer section 200 to form images.

1. Image Reading Section 100

An original on an original glass 107 is irradiated with light from an exposure lamp 101. The reflected light from the original is led by way of three mirrors 103a to 103c to a lens 104 and imaged at a CCD sensor 105.

The exposure lamp 101 and the mirror 103a are moved in the direction of the arrow by a scanner motor 102 at a speed V responsive to the magnification, so that the entire area of the original on the original glass 107 is scanned. As the exposure lamp 101 and the mirror 103a are scanned, the mirrors 103b and 103c are moved in the same direction at a speed V/2.

The reflected light from the original being incident on the CCD sensor 105 is converted into electric signals in the sensor. Then, the electric signals undergo analog signal processing, A/D conversion and digital image processing at an image processing circuit 106 and are then transmitted to the interface 108 or to the printer section 200.

2. Printer Section 200

2-1. Exposure Unit

In the printer section 200, an exposure head 202 and elements around a photosensitive body 204 are disposed. Description will be given mainly on these elements.

The image data transmitted from the image reading section 100 or the interface 108 undergo correction processing such as γ correction at an image data correction unit 201 and are then transmitted to the exposure head 202. In the exposure head 202, a laser emits light in accordance with the electric signals of the transmitted image data. The light emitted by the laser is primary-scanned by a polygonal mirror and reaches the photosensitive body 204 by way of a pair of mirrors 203.

2-2. Elements Around Photosensitive Body

Elements for an electrophotographic process are arranged around the photosensitive body 204. The photosensitive body 204 rotates in the clockwise direction of the figure so that the steps of the processing are continuously performed.

First, the photosensitive body 204 is charged by a charger 205. The charged photosensitive body is exposed by the laser beam. The laser emission is set so that the brightness thereof increases as the density of the image data increases. The charges on the photosensitive body are removed according to the laser emission. Then, the charge-removed portions are developed by a developer unit 206. The toner image formed on the photosensitive body 204 is transferred onto the sheet by a transfer charger 209. After the residual toner is removed from the photosensitive body by a cleaner 210, the photosensitive body is again charged by a main eraser 211 for the next process.

In the electrophotographic process, the steps of charging, exposure, development, transfer and cleaning are regarded as one routine and repeatedly performed to form images. To form full-color images, this routine is repeated four times for each development color.

2-3. Paper Feeding/Conveyance

The sheets on which the images are to be transferred are supplied to a transfer belt in the order described below and the final output images are formed thereon. Sheets of various sizes are set in paper feeding cassettes 212. A sheet of a desired size is supplied to the conveyance path by a paper feeding roller 213 attached to each paper feeding cassette. The sheet supplied to the conveyance path is sent through conveying rollers 214 to timing rollers 217.

2-4. Transfer/Fixing

Onto the sheet supplied by the timing rollers 217, a toner image is transferred by the transfer charger 209. After the toner image is transferred onto the sheet, the charges on the sheet are removed by a removing and separating charger 221. Then, the sheet is separated from the photosensitive body 204.

The toner image on the sheet separated from the photosensitive body is heated by fixing rollers 223. After the toner is melted and fixed onto the sheet, the sheet is discharged onto a discharge tray 225.

3. Image Processing Circuit 106

Figure 6:
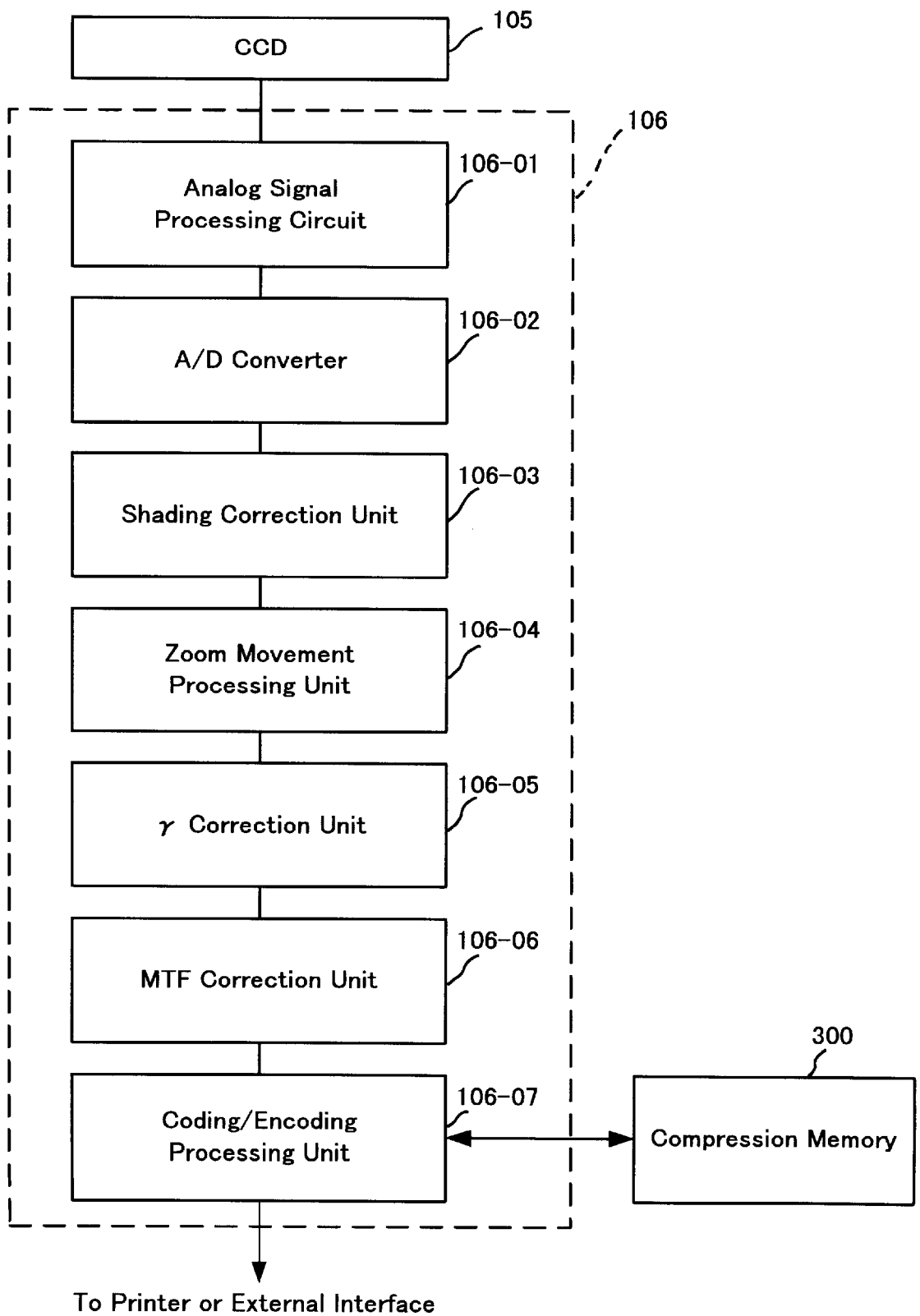
FIG. 6 is a block diagram showing the configuration of an image processing circuit of FIG. 5.

FIG. 6 is a block diagram showing a concrete configuration of the image processing circuit 106 of FIG. 5.

Referring to the figure, the image processing circuit 106 comprises an analog signal processing circuit 106-01, an A/D converter 106-02, a shading correction unit 106-03, a zoom movement processing unit 106-04, a γ correction unit 106-05, an MTF correction unit 106-06 and a coding/decoding processing unit 106-07. To the coding/decoding processing unit 106-07, a compression memory 300 is connected.

The electric signals photoelectrically converted by the CCD sensor 106 are output as analog signals proportional to the reflected light from the original. The analog signals output from the CCD sensor 105 undergo sample and hold, amplification and damp adjustment at the analog signal processing circuit 106-01. Then, the analog signals are converted by the A/D converter 106-02 into 256-gradation digital signals representing each pixel with 8 bits. Then, the data of the digital signals undergo shading correction for eliminating CCD chip variations at the shading correction unit 106-03.

Then, at the zoom movement processing unit 106-04, the digital signal data undergo zoom processing and print position change in accordance with the size of the image to be output. Then, the digital signal data undergo correction in accordance with the overall gradation characteristics at the γ correction unit 106-05. Then, the digital signal data undergo spatial image correction such as image edge enhancement at the MTF correction unit 106-06. At the coding/decoding processing unit 106-07, the digital signal data are coded to efficiently store the images in the compression memory 300 as necessary or image data are read from the compression memory 300 and decoded. When necessary, multilevel error diffusion processing is performed at the coding/decoding processing unit 106-07.

The image signals (digital signal data) thus processed are sent to the printer to be printed, or sent to an external interface to be transmitted to an external apparatus.

3-1. Multilevel Error Diffusion Processing Circuit

Figure 7:
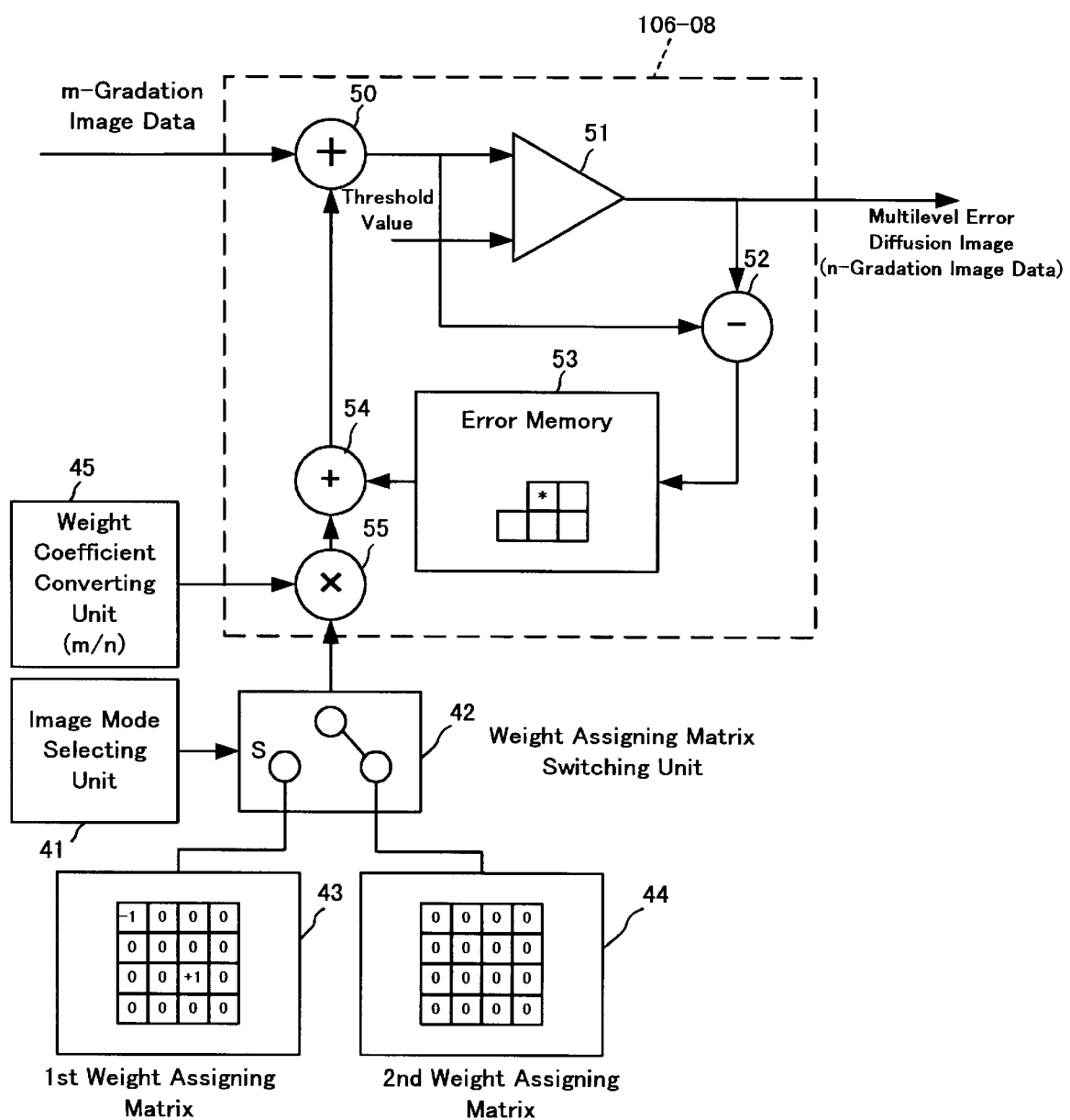
FIG. 7 is a block diagram showing the configuration of a multilevel error diffusion processing circuit included in a coding/decoding processing unit 106-07 of FIG. 6.

FIG. 7 is a block diagram showing the configuration of a multilevel error diffusion processing circuit included in the coding/decoding processing unit 106-07 of FIG. 6.

Referring to the figure, the multilevel error diffusion processing circuit converts m-gradation image data of the original image (here, m=256) into n-gradation image data. Here, n is a given integral value that is higher than 2 but lower than m.

In the multilevel error diffusion processing circuit, an adder 50 adds a correction value described later and an error to the image data of a target pixel to be processed.

The output from the adder 50 is input to a gradation converter 51. At the gradation converter 51, the output value from the adder 50 and predetermined threshold values are compared. Here, the gradation converter 51 has the same configuration as that shown in FIG. 2, and when the image data is converted into 16-gradation image data, the number of gradations is converted by use of 15 comparators. When the value of n is changed, the number of comparators used and the threshold values supplied to the comparators are changed.

At a subtracter 52, the output of the gradation converter 51 is subtracted from the output of the adder 50 to calculate the error. Here, the output of the gradation converter 51 subtracted by the subtracter 50 corresponds to the data Ti of FIG. 2.

The output from the subtracter 52 is stored in an error memory 53 as error data. Although not shown, like the one shown in FIG. 1, the output from the subtracter 52 is distributed to a plurality of pixels situated on the periphery of the target pixel based on an error addition matrix, and stored in the error memory 53 as the error data of the peripheral pixels. The error data stored in the error memory 53 is read out when the corresponding pixel of the error data becomes the target pixel and input to the gradation converter 51, added to a correction value (weight) described later by the adder 54, and output to the adder 50.

Correction values are generated by an image mode selecting unit 41, a weight assigning matrix switching unit 42, a first weight assigning matrix 43, a second weight assigning matrix 44, a weight coefficient converting unit 45 and a multiplier 55.

The image mode selecting unit 41 generates an image mode signal corresponding to an image mode (e.g. a character mode, a character/picture mode, or a picture mode). To decide the image mode, the user selects a mode in accordance with the kind of the original image by use of an operation panel (not shown), or the kind of the original image is automatically detected by pre-scanning the original image and performing image processing.

The output from the image mode selecting unit 41 is input to the eight assigning matrix switching unit 42. The weight assigning matrix witching unit 42 selects the first weight assigning matrix 43 or the econd weight assigning matrix 44 based on the image mode signal from he image mode selecting unit 41.

The weight coefficient converting unit 45 multiplies the weight assigning matrix selected by the image mode selecting unit 41 and the weight assigning matrix converting unit 42 by a coefficient predetermined in accordance with the post-conversion number of gradations (the value of n).

When the picture mode placing emphasis on the reproducibility of halftone images is selected by the image mode selecting unit 41, the weight assigning matrix switching unit 42 selects the first weight assigning matrix 43. When the character mode placing emphasis on the reproducibility of line images is selected, the weight assigning matrix switching unit 42 selects the second weight assigning matrix 44.

The first weight assigning matrix 43 is for generating periodic patterns as shown in FIG. 7. By this matrix being employed, the pseudo contours (periodic streaks) characteristic of multilevel error diffusion images is prevented from appearing. The first weight assigning matrix 43 is constituted by any ones of the weight coefficients −1, 0 and +1. In the matrix, the sum total of the weight coefficients is 0, so that the overall density of the image does not change even after the matrix is added. As a result, the advantages of the error diffusion method are not impaired. By adding the first weight assigning matrix 43 to the original image data, the output image is similar to a halftone dot image.

The second weight assigning matrix is constituted only by 0. Therefore, by the second weight assigning matrix being employed, the pseudo contour reduction is substantially not performed. Consequently, the image quality degradation is prevented and output images where the advantages of the error diffusion method are not impaired are obtained.

The matrix selected by the weight assigning matrix switching unit 42 is multiplied by an integer by the weight coefficient converting unit 45 and the multiplier 55. Specifically, the coefficients included in the matrix are multiplied by approximately m/n. Here, m is the number of data levels (the number of gradations) of the input image data, and n is the number of data levels (the number of gradations) of the output image data.

For example, when input image data of 8 bits (256 gradations) are converted into data of 4 bits (256 gradations) through the multilevel error diffusion, the weight coefficient is 16(m/n=256/16).

When m-gradation image data are converted into n-gradation image data through the multilevel error diffusion, if the weight assigning level (correction value) is too much lower than m/n, the density area not gradation-represented by dithering ((B) in FIG. 4) remains intact as mentioned previously, so that the streaks (pseudo contours) remain conspicuous.

On the contrary, if the weight assigning level (correction value) is too much higher than m/n, the intensity of the pseudo gradation representation is too high, so that the image quality is degraded. For this reason, it is necessary for the weight coefficient converting unit 45 to be properly set.

FIG. 8 is a view of assistance in explaining addition of the weight assigning matrix and the original image data.

When the input image data of coordinates (i, j) is I(i, j), the error data stored in the error memory is E(i, j) and the value in the k row, the l column of the weight assigning matrix is W(k, l) as shown in FIG. 8, the correction value added to the error data E(i, j) by the adder 54 is represented by the following expression (1):

$$W(MOD(i, 4), MOD(j, 4)) \times (m/n) \qquad (1)$$

In the expression (1), MOD(a, b) is the remainder of a divided by b. For example, the weight assigning value added at input image data I(0, 0), I(4, 0) and I(8, 0) is W(0, 0).

That is, the data output from the adder 54 is represented by the following expression (2):

$$E(i, j) + W(MOD(i, 4), MOD(j, 4)) \times (m/n) \qquad (2)$$

FIG. 9 is a view of assistance in explaining effects of this embodiment. Referring to the figure, it is assumed that the output gradation level of the input original image data gradually increases from 1 to 3. At this time, when the second weight assigning matrix 44 is selected by the weight matrix converting unit 42, like in FIG. 4, the area (A) gradation-represented by dithering and the area (B) not gradation-represented by dithering appear in the output multilevel error diffusion image data.

However, by the first weight matrix 43 being selected by the weight assigning matrix selecting unit 42, the circled component in the right of FIG. 9 is added to the original image data as the correction value. Consequently, a level variation is added to the output multilevel error diffusion image data also in the area (B) which is not gradation-represented.

Applying this to an example of an actual image output, when the second weight assigning matrix 44 is employed, the area (A) gradation-represented by dithering and the area (B) not gradation-represented by dithering appear as streaks as shown in FIG. 10. On the contrary, by the first weight assigning matrix 43 being employed, a level variation occurs also in the area (B) of FIG. 10, so that the output image data includes no streaks as shown in FIG. 11.

In this embodiment, since a matrix of the arrangement shown in FIG. 7 is used as an example of the first weight assigning matrix 43, the output image is similar to a halftone dot image. However, such a matrix is only one example; for example, a matrix of a multi-line pattern as shown in FIG. 12 may be employed as the first weight assigning matrix to prevent the appearance of pseudo contours. Instead of changing the matrix pattern, the matrix size may be changed as shown in FIG. 13. When the correction value of each value of the matrix shown in FIG. 13 is W(i, j) as shown in FIG. 15, the data output from the adder 54 are as represented by the following expression (3):

$$E(i, j) + W(MOD(i, 8), MOD(j, 8)) \times (m/n) \qquad (3)$$

Although the present invention has been fully described by way of examples with reference to the accompanying drawings, it is to be noted that various changes and modifications will be apparent to those skilled in the art.

Therefore, unless such changes and modification depart from the scope of the present invention, they should be construed as being included therein.

What is claimed is:

1. An image processor comprising:
   a gradation converter for converting pixel data represented with m gradations into pixel data represented with n gradations;
   an error calculation circuit for calculating an error generated by the conversion of said gradation converter;
   an error diffusing circuit for diffusing the error calculated by said error calculation circuit to peripheral pixels situated on the periphery of a target pixel;
   a selecting unit for selecting a data processing mode; and
   an weight assigning circuit for adding a weight assigning value corresponding to the data processing mode selected by the selecting unit to the pixel data of the peripheral pixel to be converted; and
   wherein m and n are both given integers and satisfy $2<n<m$ and the weight assigning value added by the weight assigning circuit is decided in accordance with the value of n.

2. The image processor as claimed in claim 1, wherein said gradation converter includes a converter for comparing pixel data of the target pixel with a predetermined threshold value.

3. The image processor as claimed in claim 1, wherein said an error calculation circuit includes a subtracter for calculating an error between the pixel data having been converted by said converter and pixel data before the conversion.

4. The image processor as claimed in claim 1, wherein said error diffusing circuit includes an error memory for assigning the error to the peripheral pixels.

5. The image processor as claimed in claim 1, wherein said weight assigning circuit includes a plurality of weight assigning matrices and a selector for selecting one from said weight assigning matrixes according to the processing mode selected by the selecting unit.

6. An image processor comprising:
   a gradation converter for converting pixel data represented with m gradations into pixel data represented with n gradations;
   an error calculation circuit for calculating an error generated by the conversion of said gradation converter;
   an error diffusing circuit for diffusing the error calculated by said error calculation circuit to peripheral pixels situated on the periphery of a target pixel;
   a selecting unit for selecting a data processing mode; and
   an weight assigning circuit for adding a weight assigning value corresponding to the data processing mode selected by the selecting unit to the pixel data of the peripheral pixel to be converted; and
   wherein m and n are both given integers and satisfy $2<n<m$,
   wherein said weight assigning circuit includes a plurality of weight assigning matrices and a selector for selecting one from said weight assigning matrixes according to the processing mode selected by the selecting unit, wherein said weight assigning circuit further includes a weight correction circuit for correcting the weight assigning value according to the value of m and n.

7. An image processor comprising:
   a gradation converter for converting pixel data represented with m gradations into pixel data represented with n gradations, wherein m and n are both given integers and satisfy $2<n<m$;
   an error calculation circuit for calculating an error generated by the conversion of said gradation converter;
   an error diffusing circuit for diffusing the error calculated by said error calculation circuit to peripheral pixels situated on the periphery of a target pixel; and
   an weight assigning circuit for adding a weight assigning value decided according to the value of the n to the pixel data of the peripheral pixel to be converted.

8. The image processor as claimed in claim 7, wherein said gradation converter includes a converter for comparing pixel data of the target pixel with a predetermined threshold value.

9. The image processor as claimed in claim 7, wherein said an error calculation circuit includes a subtracter for calculating an error between the pixel data having been converted by said converter and pixel data before the conversion.

10. The image processor as claimed in claim 7, wherein said error diffusing circuit includes an error memory for assigning the error to the peripheral pixels.

11. The image processor as claimed in claim 7, wherein said weight assigning circuit includes a plurality of weight assigning matrices and a selector for selecting one from said weight assigning matrixes.

12. An image processing method comprising steps of:
    converting pixel data represented with m gradations into pixel data represented with n gradations;
    calculating an error generated by the conversion of said converting step;
    diffusing the calculated to peripheral pixels situated on the periphery of a target pixel;
    selecting a data processing mode; and
    adding a weight assigning value corresponding to the selected data processing mode to the pixel data of the peripheral pixel to be converted; and
    wherein m an n are both given integers and satisfy $2<n<m$,
    wherein the weight assigning value added in said adding step is decided in accordance with the value of n.

13. An image processing method comprising steps of:
    converting pixel data represented with m gradations into pixel data represented with n gradations, wherein m and n are both given integers and satisfy $2<n<m$;
    calculating an error generated by the conversion of said converting step;
    diffusing the calculated error to peripheral pixels situated on the periphery of a target pixel; and
    adding a weight assigning value decided according to the value of n to the pixel data of the peripheral pixel to be converted.

* * * * *